(12) United States Patent
Yeh et al.

(10) Patent No.: US 8,395,838 B1
(45) Date of Patent: Mar. 12, 2013

(54) DISPLAY DEVICE AND METHOD FOR MANUFACTURING THE SAME

(75) Inventors: Hsu-Cheng Yeh, Hsinchu (TW); Ming-Chuan Hung, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 0 days.

(21) Appl. No.: 13/409,520

(22) Filed: Mar. 1, 2012

(30) Foreign Application Priority Data

Aug. 16, 2011 (TW) .............................. 100129245 A (51) Int. Cl.
*G02B 26/00* (2006.01)
(52) U.S. Cl. ..................... 359/296; 359/290; 359/245
(58) Field of Classification Search ............... 359/296
See application file for complete search history.

(56) References Cited

U.S. PATENT DOCUMENTS

| 2009/0309870 A1* | 12/2009 | Takei | 345/214 |
| 2011/0304652 A1* | 12/2011 | Korthuis et al. | 345/690 |

* cited by examiner

*Primary Examiner* — James Jones
(74) *Attorney, Agent, or Firm* — WPAT PC; Justin King (57) ABSTRACT

A display device includes a driving layer and a displaying layer disposed on the driving layer. The driving layer includes a lower substrate, a number of driving segments and a number of conducting wires. The lower substrate has a first surface. The driving segments and the conducting wires both are disposed on the first surface of the lower substrate. The driving segments are connected to the conducting wires in a one-to-one manner. A line width of each of the conducting wires is less than 50 microns. The display device has a high resolution. A method for manufacturing the display device is also provided.

12 Claims, 5 Drawing Sheets

DISPLAY DEVICE AND METHOD FOR MANUFACTURING THE SAME

TECHNICAL FIELD

The present invention relates to a display device and a method for manufacturing the same, and more particularly to an electronic paper display device and a method for manufacturing the same.

BACKGROUND

For a very long time, people have read paper books. Nowadays, due to development of electronic technology, people can read electronic books via a display.

However, a traditional display device displays a literal image by using a backlight source to illuminate, which is prone to visual fatigue. Thus, it is not suitable to be read for a long time by a reader. In addition, the traditional display device such as a cold cathode ray tube display device and a liquid crystal display device has a shortcoming of continuous power consumption. Therefore, recently, an electronic paper display device has been developed due to its advantages of lightness, thinness and low power consumption.

The electronic paper display device is based on an electrophoresis principle. Charged pigment particles in the electronic paper display device are driven by an electric field to move, thereby achieving a color contrast to display an image. The electronic paper display device has low power consumption because its bistable property. In addition, the electronic paper display device has a wide viewing angle. The familiar electronic paper display device is, for example, a microcapsule electronic paper display device or a microcup electronic paper display device.

Figure 1:
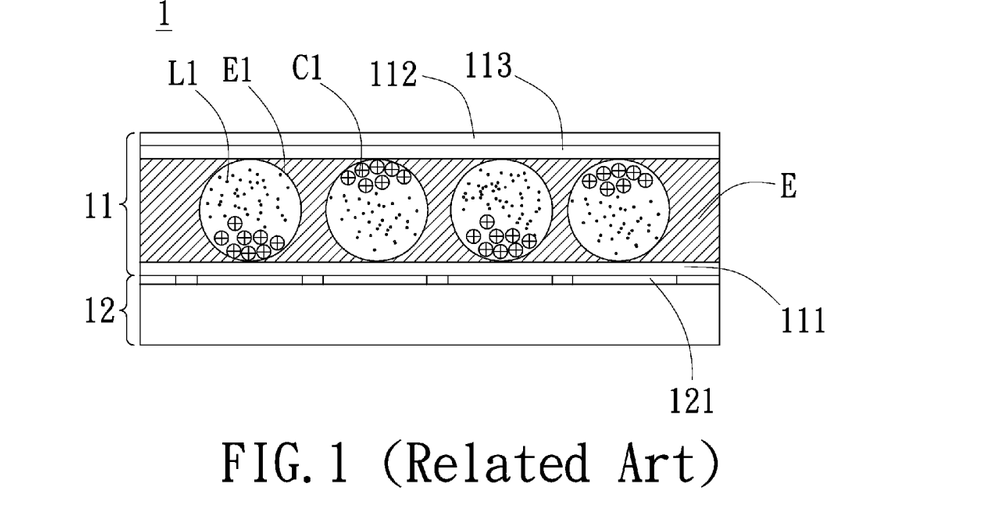
FIG. 1 is a cross-sectional, schematic view of a typical microcapsule electronic paper display device.

Referring to FIG. 1, a typical microcapsule electronic paper display device 1 includes an electronic paper 11 and a driving substrate 12.

The electronic paper 11 includes a lower substrate 111, an upper substrate 112 facing to the lower substrate 111, and an electrophoretic material E disposed between the upper substrate 112 and the lower substrate 111. A common electrode 113 is fixed to the upper substrate 112 and faces to the lower substrate, and a number of pixel electrodes 121 are disposed on the driving substrate 12. The common electrode 113 is cooperated with the pixels electrodes 121 to form a number of electric fields. The electrophoretic material E includes a number of light color pigment particles C1 and a deep color medium solution L1. The pigment particles C1 and the medium solution L1 both are received in a number of microcapsule E1 respectively. The microcapsule E1 can be adhered to each other by an adhesive.

For example, when an electric field is generated between a pixel electrode 121 and the common electrode 113 (i.e., the pixel electrode 121 is driven), the charged light color pigment particles C1 are driven to move near to the upper substrate 112 of the typical microcapsule electronic paper display device 1. The charged light color pigment particles C1 reflect an external light, thereby displaying the light color of the pigment particles C1 at a pixel position corresponding to the pixel electrode 121. When no electric field is generated between a pixel electrode 121 and the common electrode 113 (i.e., the pixel electrode 121 is not driven), the charged light color pigment particles C1 are located near to the lower substrate 111 of the typical microcapsule electronic paper display device 1. The deep color medium solution L1 reflect an external light, thereby displaying the deep color of the medium solution L1 at a pixel position corresponding to the pixel electrode 121. By controlling one portion of the pixel electrodes 121 of the typical microcapsule electronic paper display device 1 to be driven and controlling another portion of the pixel electrodes 121 of the typical microcapsule electronic paper display device 1 not to be driven, the typical microcapsule electronic paper display device 1 can display an image. Even if the power was cut off, the typical microcapsule electronic paper display device 1 still can display an image displayed in the last driven state. In other words, when people use the typical microcapsule electronic paper display device 1, the power consumption is very low.

Figure 2:
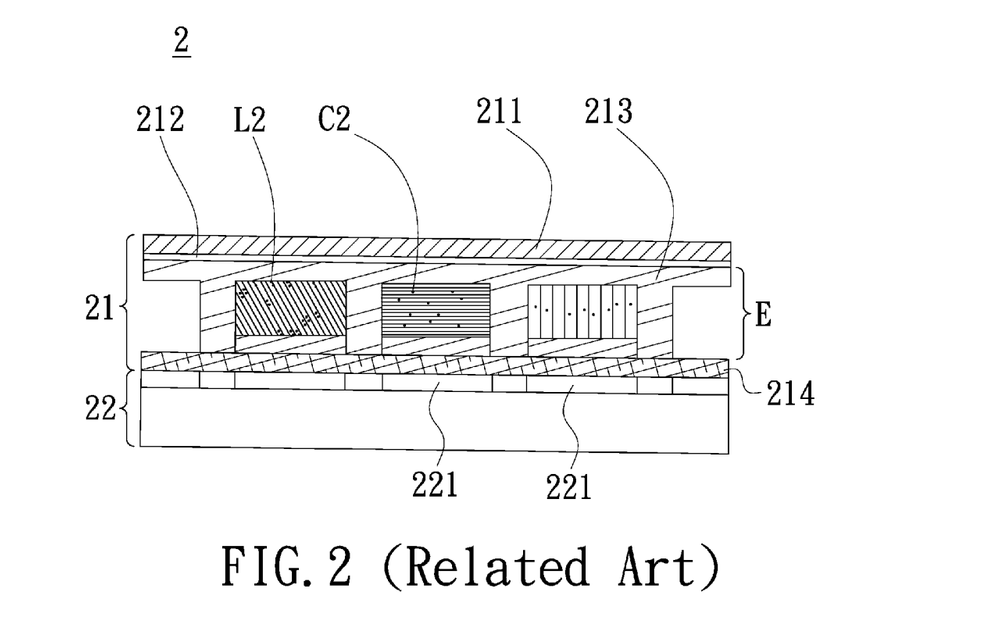
FIG. 2 is a cross-sectional, schematic view of a typical microcup electronic paper display device.

Referring to FIG. 2, a typical microcup electronic paper display device 2 includes an electronic paper 21 and a driving substrate 22. The electronic paper 21 includes an upper substrate 211, a common electrode 212 fixed to the upper substrate 211, a microcup layer 213 and a lower substrate 214.

The typical microcup electronic paper display device 2 is similar to the typical microcapsule electronic paper display device 1 except that the structure of the electronic paper 21. The microcup layer 213 of the typical microcup electronic paper display device 2 is configured for receiving the electrophoretic material E. It is noted that, the electrophoretic material E of the typical microcapsule electronic paper display device 1 is received in the microcapsule E1. The microcup layer 213 is made of a polymer resin and is formed by using a roll-to-roll process. The microcup layer 213 includes a number of cavities for receiving a number of charged light color pigment particles C2 and a deep color medium solution L2. After the charged light color pigment particles C2 and the deep color medium solution L2 are filled, the cavities of the microcup layer 213 is sealed. The microcup layer 213 can be adhered to the upper substrate 211 via an adhesive layer. By controlling the pixel electrodes 221 of the driving substrate 22 to be driven or not to be driven, the typical microcup electronic paper display device 2 can display an image.

With development of the electronic paper display technology, the resolution of the electronic paper display device is continuously increased so that the electronic paper display device can be widely applied. However, the current structure of the driving substrate 12/22 and the current fabricating process of the driving substrate 12/22 limit the development of the electronic paper display device. For example, the typical microcapsule electronic paper display device 1 and the typical microcup electronic paper display device 2 may display the borders or the shadow lines of a number of conductive wires connected to the pixel electrodes 121/221, which is not hoped to be displayed. As a result, the resolution of the electronic paper display device is limited and can not be increased continuously.

SUMMARY

Therefore, the present invention provides a display device with a high resolution.

The present invention provides a method for manufacturing a display device so as to increase a resolution of the display device.

The present invention provides a display device including a driving layer and a displaying layer disposed on the driving layer. The driving layer includes a lower substrate, a number of driving segments and a number of conducting wires. The lower substrate has a first surface. The driving segments and the conducting wires are disposed on the first surface of the lower substrate. The driving segments are connected to the conducting wires in a one-to-one manner. A line width of each of the conducting wires is less than 50 microns.

In one embodiment provided by the present invention, the conducting wires constitute a number of conducting wire sets, a width of each of the conducting wire sets is less than 100 microns.

In one embodiment provided by the present invention, an interval width between the two adjacent conducting wire sets is more than 50 microns.

In one embodiment provided by the present invention, a width of each of the conducting wire sets is less than 50 microns.

In one embodiment provided by the present invention, the driving segments are separately arranged on the first surface of the lower substrate to form an array. Each of the conducting wires is designed to be located in a gap between the two adjacent driving segments. Each of the conducting wires comprises a first end and a second end opposite to the first end, the first end is connected to the corresponding driving segment, and the second end is located at a side of the driving layer.

In one embodiment provided by the present invention, the displaying layer comprises a number of microcapsules disposed on the driving segments respectively.

In one embodiment provided by the present invention, the display device further includes an upper electrode layer disposed on the displaying layer. The upper electrode layer includes an upper substrate and a transparent electrode layer. The transparent electrode layer is located between the upper substrate and the displaying layer.

The present invention provides a method for manufacturing a display device including the following steps. A lower substrate is provided and a conducting layer is formed on the lower substrate. A negative photoresist layer is formed on the conducting layer. A mask is disposed on the negative photoresist layer. The mask defines a number of a first light transmission portions and a number of second light transmission portions. The first light transmission portions are connected to the second light transmission portions in a one-to-one manner. A line width of each of the second light transmission portions is less than 50 microns. The conducting layer is patterned by a photolithography process using the negative photoresist layer and the mask so as to form a driving layer. The driving layer includes the lower substrate, a number of driving segments corresponding to the first light transmission portions and a number of conducting wires corresponding to the second light transmission portions. The driving segments and the conducting wires are disposed on a same surface of the lower substrate. The driving segments are connected to the conducting wires in a one-to-one manner. A line width of each of the conducting wires is less than 50 microns. A displaying layer and an upper substrate are subsequently disposed on the driving layer.

In one embodiment provided by the present invention, the second light transmission portions constitute a plurality of second light transmission portion sets, a width of each of the second light transmission portion sets is less than 100 microns.

In one embodiment provided by the present invention, an interval width between the two adjacent second light transmission portion sets is more than 50 microns.

In one embodiment provided by the present invention, a width of each of the second light transmission portion sets is less than 50 microns.

The present invention provides a method for manufacturing a display device including the following steps. A lower substrate is provided and a conducting layer is formed on the lower substrate. A positive photoresist layer is formed on the conducting layer. A mask is disposed on the positive photoresist layer. The mask includes a number of first light blocking portions and a number of second light blocking portions. The first light blocking portions are connected to the second light blocking portions in a one-to-one manner. A line width of each of the second light blocking portions is less than 50 microns. The conducting layer is patterned by a photolithography process using the positive photoresist layer and the mask so as to form a driving layer. The driving layer includes the lower substrate, a number of driving segments corresponding to the first light blocking portions and a number of conducting wires corresponding to the second light blocking portions. The driving segments and the conducting wires are disposed on a same surface of the lower substrate. The driving segments are connected to the conducting wires in a one-to-one manner. A line width of each of the conducting wires is less than 50 microns. A displaying layer and an upper electrode layer are subsequently disposed on the driving layer.

In one embodiment provided by the present invention, the second light blocking portions constitute a plurality of second light blocking portion sets, a width of each of the second light blocking portion sets is less than 100 microns.

In one embodiment provided by the present invention, an interval width between the two adjacent second light blocking portion sets is more than 50 microns.

In one embodiment provided by the present invention, a width of each of the second light blocking portion sets is less than 50 microns.

In the display device of the present invention, the line width of each of the conducting wires, the width W of each of the conducting wire sets and the interval width D between the two conducting wire sets are designed so that the conducting wires are the invisible. Thus, the boarders or the shadow lines of the conducting wires will not be displayed in the display device, thereby increasing the resolution of the display device. Additionally, the method of manufacturing the display device utilizes a semiconductor process. Thus, the width of each of the conducting wires can manufactured to be less than the visible line width. Therefore, the boarders or the shadow lines of the conducting wires will not be displayed in the display device, thereby increasing the resolution of the display device. Furthermore, because the driving segments and the conducting wires are formed on a same surface of the lower substrate, the manufacturing process is simplified, there by reducing the production cost.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 3:
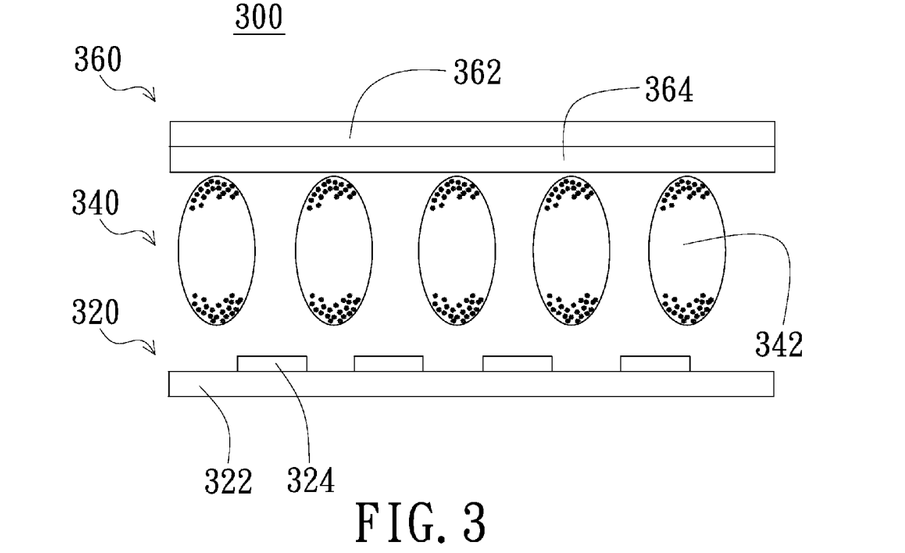
FIG. 3 is a schematic view of a display device in accordance with an embodiment of the present invention.

FIG. 3 is a schematic view of a display device in accordance with an embodiment of the present invention. Referring to FIG. 3, a display device 300 is, for example, an electronic paper display device. The display device 300 includes a driving layer 320, a displaying layer 340, and an upper electrode layer 360. The displaying layer 340 is disposed on the driving layer 320, and the upper electrode layer 360 is disposed on the displaying layer 340.

Figure 4:
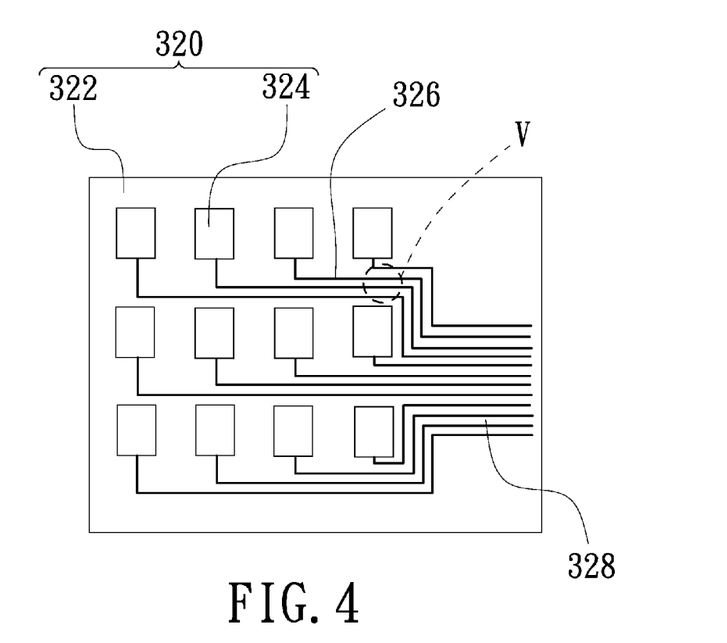
FIG. 4 is a top, schematic view of a driving layer of the display device shown in FIG. 3.

In detail, referring to FIG. 4, the driving layer 320 includes a lower substrate 322, a number of driving segments 324 (i.e., pixel electrodes), and a number of conducting wires 326. The lower substrate 322 can be, for example, a glass substrate, a plastic substrate. The driving segments 324 and the conducting wires 326 both are formed on a first surface (i.e., a top surface) of the lower substrate 322. The first surface of the lower substrate 322 faces to the displaying layer 340. The driving segments 324 are separated from each other. In the present embodiment, each of the driving segments 324 is, for example, square-shaped. The driving segments 324 are arranged in an array. In other embodiments, the configuration of the driving segments 324 can be changed according to the demand. For example, each of the driving segments 324 can be, rectangular or triangular. The driving segments 324 are connected to the conducting wires 326 in a one-to-one manner. Thus each of the driving segments 324 can be connected to an external driving circuit via a conducting wire 326 corresponding thereto.

The conducting wires 326 are configured for electrically connecting the driving segments 324 to the external driving circuit. Each of the conducting wires 326 includes a first end (not labeled) and a second end (not labeled). The first end is connected to the corresponding driving segment 324, and the second end is located at a side of the driving layer 320. Each of the conducting wires 326 is designed to be located in a gap between the driving segments 324 and the second end of each of the conducting wires 326 extends towards the side of the driving layer 320 so that the second ends of the conducting wires 326 can be located at the side of the driving layer 320. Referring to FIG. 4, in the present embodiment, the second ends of the conducting wires 326 are gathered at a right side of the driving layer 320 and are separately parallel to each other. Thus, a bonding area 328 is formed at the right side of the driving layer 320 so that the driving segments 324 can be electrically connected to the external driving circuit.

Figure 5:
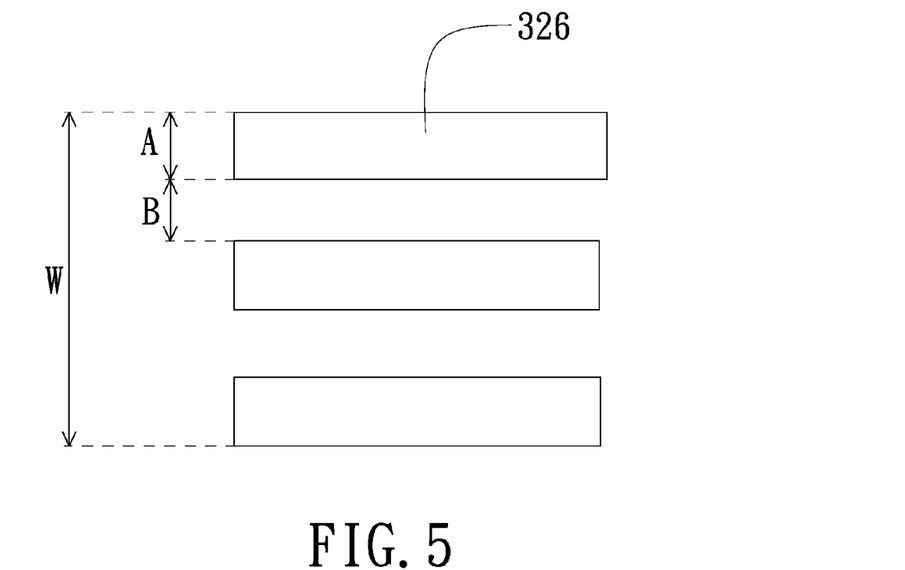
FIG. 5 is an exploded, schematic view of a part labeled by V of the driving layer shown in FIG. 4
Figure 6:
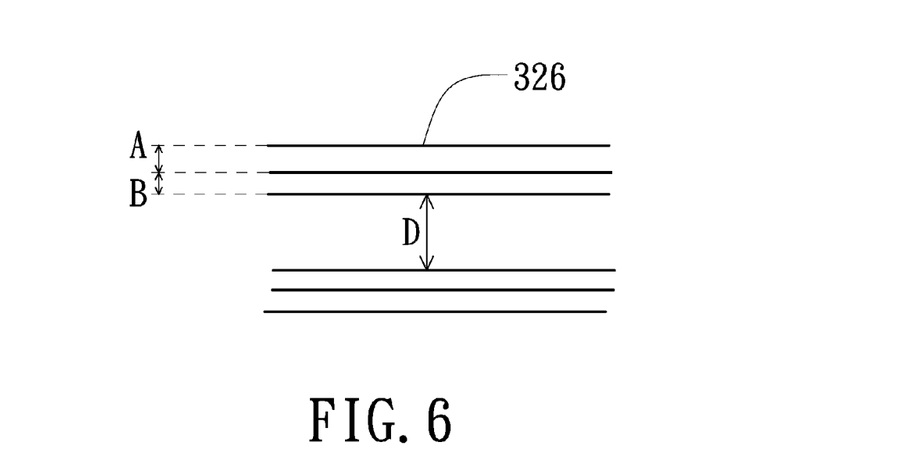
FIG. 6 is a schematic view of two adjacent conducting wire sets.

Because the boarders or the shadow lines of the conducting wires 326 are not hoped to be displayed in the display device 300, in the present embodiment, the conducting wires 326 below the displaying layer 340 constitute a number of conducting wire sets. Each of conducting wire sets includes a number of neighboring conducting wires 326. In the present embodiment, as illustrated in FIG. 4, only four neighboring conducting wires 326 are shown to represent one of the conducting wire sets. A width W of each of the conducting wire sets is less than 100 microns. Preferably, the width W of each of the conducting wire sets is less than 50 microns. Further, referring to FIG. 6, an interval is defined between the two adjacent conducting wire sets. An interval width D between the two adjacent conducting wire sets is more than 50 microns. For example, referring to FIG. 5, a line width of each of the conducting wires 326 is represented by A, and a pitch between the two adjacent conducting wires 326 is represented by B. The width W of the conducting wire set including N conducting wires 326 is calculated by the following formula: W=NA+(N−1)B. The width W of the conducting wire set should be less than 100 microns.

It is noted that, a line width in a range from 50 microns to 75 microns is visible. In the present embodiment, the width W of each of the conducting wire sets, the interval width D between the two adjacent conducting wire sets can be adjusted so that the conducting wires 326 are the invisible. Thus, the boarders or the shadow lines of the conducting wires 326 will not be displayed in the display device 300, thereby increasing the resolution of the display device 300.

The displaying layer is disposed on the driving layer 320 and covers the driving segments 324. In the present embodiment, the displaying layer 340 includes a number of microcapsules 342. The two adjacent microcapsules 324 are adhered to each other by an adhesive. In addition, the microcapsules 342 can be adhered to the driving segments 324 by an adhesive. Each of the microcapsules 342 includes a number of charged light color pigment particles and a deep color medium solution disposed therein. In another embodiment, the displaying layer 340 can a microncup layer shown in FIG. 2.

The upper electrode layer 360 is disposed on the displaying layer 340, and includes an upper substrate 362 and a transparent electrode layer 364. The upper substrate 362 can be, for example, a glass substrate. The transparent electrode layer 364 is disposed on a bottom surface of the upper substrate 362. That is, the transparent electrode layer 364 is disposed between the upper substrate 362 and the displaying layer 340, and the displaying layer 340 is disposed between the driving segments 324 and the transparent electrode layer 364. A material of the transparent electrode layer 364 can be selected from a group consisting of indium tin oxide, aluminum zinc oxide, indium zinc oxide and cadmium tin oxide.

When an electric field is generated between the transparent electrode layer 364 and a driving segment 324 corresponding to a pixel (i.e., the driving segment 324 corresponding to a pixel is driven), the charged light color pigment particles are driven to move near to the upper substrate 362 of the display device 300. The charged light color pigment particles reflect an external light, thereby displaying the light color of the pigment particles at a position of the driving segment 324 corresponding to a pixel. When no electric field is generated between the transparent electrode layer 364 and a driving segment 324 corresponding to a pixel (i.e., the driving segment 324 corresponding to a pixel is not driven), the charged light color pigment particles are located near to the lower substrate 322 of the display device 300. The deep color medium solution reflects an external light, thereby displaying the deep color of the medium solution at a position of the driving segment 324 corresponding to a pixel. By controlling one portion of the driving segments 324 of the display device 300 to be driven and controlling another portion of the driving segments 324 of the display device 300 not to be driven, the display device 300 can display an image. Because the line width of each of the conducting wire 326 is less than the visible line width, even more the width of each of the conducting wire sets is less than the visible line width, the boarders or the shadow lines of the conducting wires 326 will not be displayed in the display device 300, thereby increasing the resolution of the display device 300.

Figure 7:
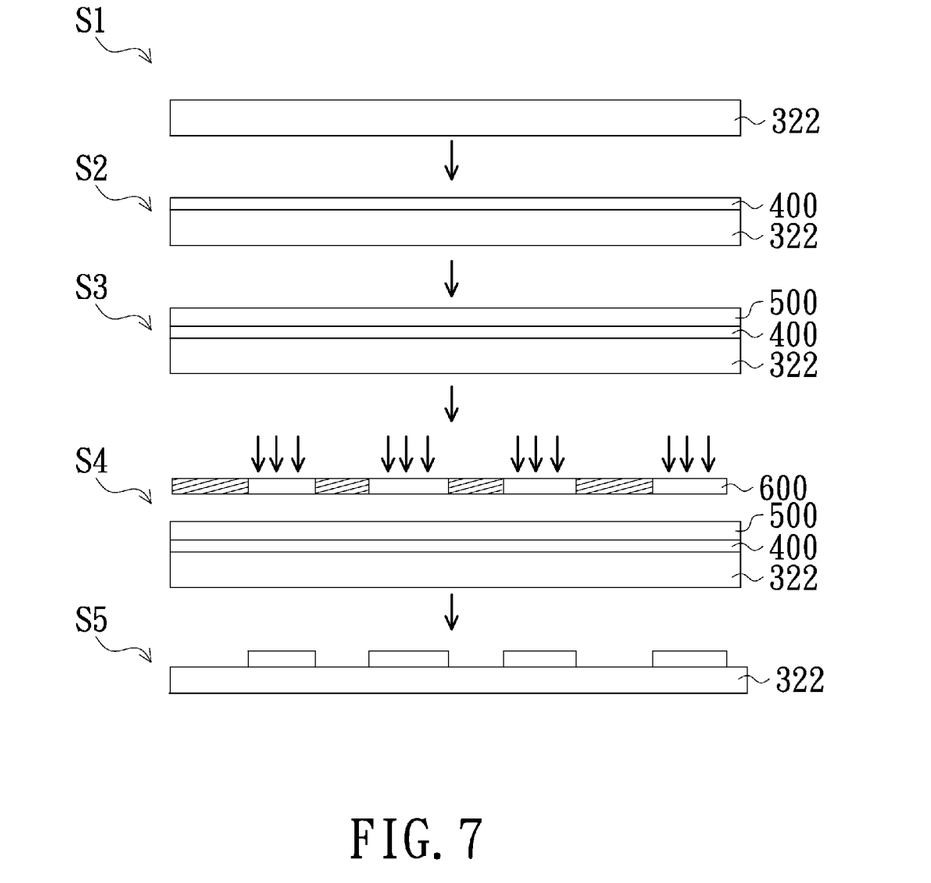
FIG. 7 is a process flow of a method for manufacturing a display device in accordance with an embodiment of the present invention.

As described above, the display device 300 is provided. In the following description, a method for manufacturing the display device 300 is provided. FIG. 7 is a process flow of a method for manufacturing a display device in accordance with an embodiment of the present invention. Referring to FIG. 7, the method of manufacturing the display device 300 includes the following steps.

Step S1: a lower substrate 322 is provided. The lower substrate 322 has a first surface (not labeled), for example, a top surface in the present embodiment.

Step S2: a conductive layer 400 is formed on the first surface of the lower substrate 322. The conductive layer 400 is made of a conductive material. In the present embodiment, the conductive layer 400 is made of metal such as molybdenum (Mo). The conductive layer 400 can be formed by a magnetron sputtering method or an evaporation deposition method.

Step S3: a photoresist layer 500 is formed on the conductive layer 400. The photoresist layer 500 can be either a positive photoresist layer or a negative photoresist layer. For example, the negative photoresist layer can include a cinnamate polymer, a polyester or a polymerized hydrocarbon. In the present embodiment, the photoresist layer 500 is the negative photoresist layer.

Figure 8:
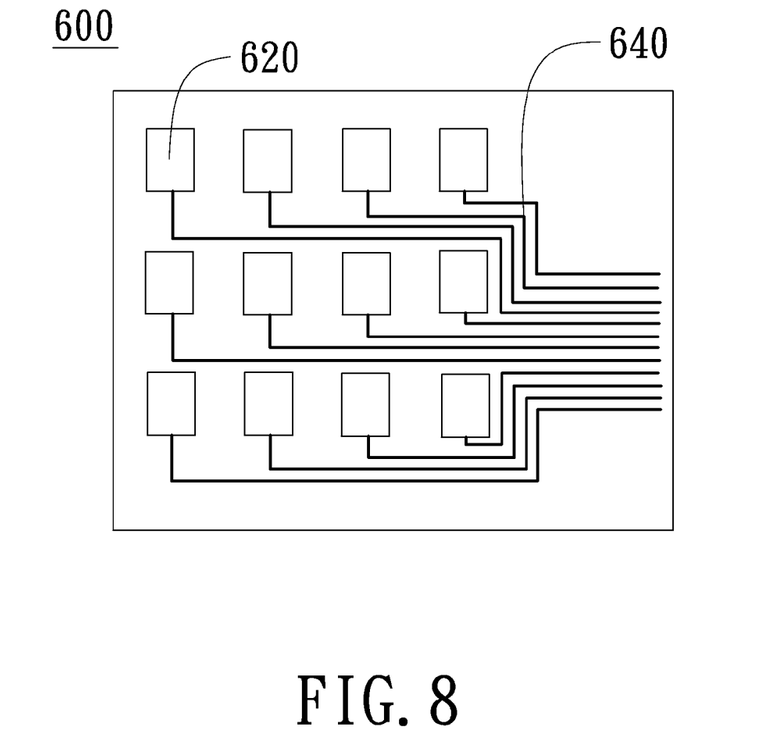
FIG. 8 is a top, schematic view of a mask shown in FIG. 7.

Step S4: a mask 600 is disposed on the photoresist layer 500 so that a photolithography process can be performed to pattern the conductive layer 400. FIG. 8 is a top, schematic view of the mask 600 shown in FIG. 7. Referring to FIG. 8, a pattern defined in the mask 600 corresponds to the driving segments 324 and the conducting wires 326 shown in FIG. 4. In the present embodiment, the mask 600 defines a number of a first light transmission portions 620 corresponding to the driving segments 324 and a number of second light transmission portions 640 corresponding to the conducing wires 326. The first light transmission portions 620 are connected to the second light transmission portions 640 in a one-to-one manner. Each of the second light transmission portions 640 includes a first end (not labeled) and a second end (not labeled). The first end is connected to the corresponding first light transmission portion 620, and the second end is located at a side of the mask 600. Each of the second light transmission portions 640 are designed to be located in a gap between the first light transmission portions 620 and the second end of each of the second light transmission portions 640 extends towards the side of the mask 600 so that the second ends of the second light transmission portions 640 can be located at the side of the mask 600. In the present embodiment, the second light transmission portions 640 constitute a number of second light transmission portion sets. Each of second light transmission portion sets includes a number of neighboring second light transmission portions 640. In the present embodiment, as illustrated in FIG. 8, only four neighboring second light transmission portions 640 are shown to represent one of the second light transmission portion sets. A width of each of the second light transmission portion sets is less than 100 microns. Preferably, the width of each of the second light transmission portion sets is less than 50 microns. An interval width between the two adjacent second light transmission portion sets is more than 50 microns.

Step S5: the conductive layer 400 is patterned by a photolithography process using the photoresist layer 500 and the mask 600 so as to form a driving layer 320 shown in FIG. 3. The photolithography process including, for example, the steps of exposing, developing, etching and removing the photoresist layer 500 are not described here.

Next, a displaying layer 340 and an upper electrode layer 360 are subsequently disposed on the driving layer 320. As a result, a display device 300 shown in FIG. 3 is manufactured.

In other embodiments, the photoresist layer 500 can be the positive photoresist layer. A pattern of the mask is complementary to the pattern of the mask 600. For example, the mask includes a number of first light blocking portions corresponding to the driving segments 324 and a number of second light blocking portions corresponding to the conducting wires 326. The first light blocking portions are connected to the second light blocking portions in a one-to-one manner. Each of the second light blocking portions includes a first end (not labeled) and a second end (not labeled). The first end is connected to the corresponding first light blocking portions, and the second end is located at a side of the mask. Each of the second light blocking portions are designed to be located in a gap between the first light blocking portions and the second end of each of the second light blocking portions extends towards the side of the mask so that the second ends of the second light blocking portions can be located at the side of the mask. In the present embodiment, the second light blocking portions constitute a number of second light blocking portion sets. Each of second light blocking portion sets includes a number of neighboring second light blocking portions. A width of each of the second light blocking portion sets is less than 100 microns. Preferably, the width of each of the second light blocking portion sets is less than 50 microns. An interval width between the two adjacent second light blocking portion sets is more than 50 microns.

In summary, in the display device of the present invention, the line width of each of the conducting wires, the width W of each of the conducting wire sets and the interval width D between the two conducting wire sets are designed so that the conducting wires 326 are the invisible. Thus, the boarders or the shadow lines of the conducting wires 326 will not be displayed in the display device 300, thereby increasing the resolution of the display device 300. Additionally, the method of manufacturing the display device 300 utilizes a semiconductor process. Thus, the width of each of the conducting wires 326 can manufactured to be less than the visible line width. Therefore, the boarders or the shadow lines of the conducting wires 326 will not be displayed in the display device 300, thereby increasing the resolution of the display device 300. Furthermore, because the driving segments 324 and the conducting wires 326 are formed on a same surface of the lower substrate 322, the manufacturing process is simplified, there by reducing the production cost.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A display device, comprising:
 a driving layer, comprising:
  a lower substrate having a first surface;
  a plurality of driving segments disposed on the first surface; and
  a plurality of conducting wires disposed on the first surface, the conducting wires being connected to the driving segments in a one-to-one manner, a line width of each of the conducting wires being less than 50 microns; and a displaying layer disposed on the driving layer, wherein the conducting wires below the displaying layer constitute a plurality of conducting wire sets, a width of each of the conducting wire sets is less than 100 microns, the line width of each of the conducting wires is represented by A, a pitch between the two adjacent conducting wires is represented by B, the width of each of the conducting wire sets is represented by W, the number of the conducting wires of each of the conducting wire sets is represented by N, N is an integer and greater than 1, and $W=NA+(N-1)B$.

2. The display device according to claim 1, wherein an interval width between the two adjacent conducting wire sets is more than 50 microns.

3. The display device according to claim 1, wherein a width of each of the conducting wire sets is less than 50 microns.

4. The display device according to claim 1, wherein the driving segments are separately arranged on the first surface of the lower substrate to form an array, each of the conducting wires is designed to be located in a gap between the two adjacent driving segments, each of the conducting wires comprises a first end and a second end opposite to the first end, the first end is connected to the corresponding driving segment, the second end is located at a side of the driving layer.

5. The display device according to claim 1, wherein the displaying layer comprises a plurality of microcapsules disposed on the driving segments respectively.

6. The display device according to claim 1, further comprising an upper electrode layer disposed on the displaying layer, the upper electrode layer comprising:
   - an upper substrate; and
   - a transparent electrode layer, the transparent electrode layer being located between the upper substrate and the displaying layer.

7. A method for manufacturing a display device, comprising:
   providing a lower substrate;
   forming a conductive layer on the lower substrate;
   forming a negative photoresist layer on the conductive layer;
   disposing a mask on the negative photoresist layer, the mask defining a plurality of a first light transmission portions and a plurality of second light transmission portions, the second light transmission portions being connected to the first light transmission portions in a one-to-one manner, a line width of each of the second light transmission portions being less than 50 microns;
   patterning the conductive layer by a photolithography process using the negative photoresist layer and the mask so as to form a plurality of driving segments corresponding to the first light transmission portions and a plurality of conducting wires corresponding to the second light transmission portions, the driving segments, the conducting wires and the lower substrate constituting a driving layer;
   disposing a displaying layer on the driving layer; and
   disposing an upper electrode layer on the displaying layer,
   wherein the conducting wires below the displaying layer constitute a plurality of conducting wire sets, a width of each of the conducting wire sets is less than 100 microns, the line width of each of the conducting wires is represented by A, a pitch between the two adjacent conducting wires is represented by B, the width of each of the conducting wire sets is represented by W, the number of the conducting wires of each of the conducting wire sets is represented by N, N is an integer and greater than 1, and $W=NA+(N-1)B$.

8. The method according to claim 7, wherein an interval width between the two adjacent conducting wire sets is more than 50 microns.

9. The method according to claim 7, wherein a width of each of the conducting wire sets is less than 50 microns.

10. A method for manufacturing a display device, comprising:
    providing a lower substrate;
    forming a conductive layer on the lower substrate;
    forming a positive photoresist layer on the conductive layer;
    disposing a mask on the positive photoresist layer, the mask defining a plurality of a first light blocking portions and a plurality of second light blocking portions, the second light blocking portions being connected to the first light blocking portions in a one-to-one manner, a line width of each of the second light blocking portions being less than 50 microns;
    patterning the conductive layer by a photolithography process using the positive photoresist layer and the mask so as to form a plurality of driving segments corresponding to the first light blocking portions and a plurality of conducting wires corresponding to the second light blocking portions, the driving segments, the conducting wires and the lower substrate constituting a driving layer;
    disposing a displaying layer on the driving layer; and
    disposing an upper electrode layer on the displaying layer,
    wherein the conducting wires below the displaying layer constitute a plurality of conducting wire sets, a width of each of the conducting wire sets is less than 100 microns, the line width of each of the conducting wires is represented by A, a pitch between the two adjacent conducting wires is represented by B, the width of each of the conducting wire sets is represented by W, the number of the conducting wires of each of the conducting wire sets is represented by N, N is an integer and greater than 1, and $W=NA+(N-1)B$.

11. The method according to claim 10, wherein an interval width between the two adjacent conducting wire sets is more than 50 microns.

12. The method according to claim 10, wherein a width of each of the conducting wire sets is less than 50 microns.

* * * * *